United States Patent
Sun et al.

(10) Patent No.: US 10,924,302 B2
(45) Date of Patent: Feb. 16, 2021

(54) INTEGRATED COMMUNICATION SYSTEM AND SERVICE PROVISIONING METHOD THEREOF

(71) Applicant: Sercomm Corporation, Taipei (TW)

(72) Inventors: Chaoyang Sun, Taipei (TW); Ben Lin, Taipei (TW)

(73) Assignee: Sercomm Corporation, Taipei (TW)

(*) Notice: Subject to any disclaimer, the term of this patent is extended or adjusted under 35 U.S.C. 154(b) by 0 days.

(21) Appl. No.: 16/432,942

(22) Filed: Jun. 6, 2019

(65) Prior Publication Data

US 2020/0389340 A1 Dec. 10, 2020

(51) Int. Cl.
| | |
|---|---|
| H04L 12/64 | (2006.01) |
| H04L 29/08 | (2006.01) |
| H04L 29/12 | (2006.01) |
| H04L 7/10 | (2006.01) |
| H04W 88/14 | (2009.01) |

(52) U.S. Cl.
CPC ......... *H04L 12/6418* (2013.01); *H04L 7/10* (2013.01); *H04L 61/1511* (2013.01); *H04L 61/2015* (2013.01); *H04L 67/2823* (2013.01); *H04L 67/34* (2013.01); *H04L 2012/6421* (2013.01); *H04L 2012/6472* (2013.01); *H04W 88/14* (2013.01)

(58) Field of Classification Search
CPC . H04L 12/6418; H04L 67/34; H04L 61/2015; H04L 67/2823; H04L 7/10; H04L 61/1511; H04L 2012/6421; H04L 2012/6472; H04W 88/14
See application file for complete search history.

(56) References Cited

U.S. PATENT DOCUMENTS 9,465,668 B1\* 10/2016 Roskind ................. H04L 67/34
9,674,035 B2    6/2017 Hajduczenia et al.
(Continued)

FOREIGN PATENT DOCUMENTS

| CN | 102655459 | 9/2012 |
|---|---|---|
| CN | 102577429 | 4/2014 |

(Continued)

*Primary Examiner* — Jung H Park
*Assistant Examiner* — Harry H Kim
(74) *Attorney, Agent, or Firm* — JCIPRNET

(57) ABSTRACT

An integrated communication system and a service provisioning method thereof are provided. The integrated communication system includes a core network entity, a service provisioning system and an intermediary apparatus. The core network entity is resided in the mobile network. The service provisioning system is conformed to a wired network other than the mobile network. The intermediary apparatus is connected between the core network entity and the service provisioning system. The intermediary apparatus receives a configuration data with a first format conformed to the wired network from the service provisioning system, and transforms the configuration data into a configuration command with a second format conformed to the mobile network. The core network entity operates according to the configuration command. Accordingly, an operator of the wired network can manage network entities and network devices in the mobile network without knowledge of operation support system (OSS) platform of the mobile network.

16 Claims, 3 Drawing Sheets

(56) References Cited

U.S. PATENT DOCUMENTS

| | | | |
|---|---|---|---|
| 9,883,260 B2 | 1/2018 | Zong | |
| 10,021,000 B2 | 7/2018 | Carter et al. | |
| 2009/0125713 A1* | 5/2009 | Karschnia | H04W 12/003 |
| | | | 713/153 |
| 2012/0307630 A1* | 12/2012 | Markwart | H04L 41/08 |
| | | | 370/228 |
| 2016/0306048 A1* | 10/2016 | Dunn | G04G 7/00 |
| 2016/0359693 A1* | 12/2016 | Carter | H04L 12/2801 |
| 2017/0006361 A1* | 1/2017 | Berg | H04B 10/27 |
| 2017/0250946 A1* | 8/2017 | Chan | H04L 61/1511 |
| 2018/0124219 A1* | 5/2018 | Klopfenstein | H04L 69/22 |
| 2018/0145931 A1* | 5/2018 | Zheng | H04L 67/1095 |
| 2018/0152771 A1 | 5/2018 | Wu | |

FOREIGN PATENT DOCUMENTS

| | | |
|---|---|---|
| CN | 104285393 | 1/2015 |
| CN | 102739426 | 5/2017 |
| CN | 108418626 | 8/2018 |

* cited by examiner

INTEGRATED COMMUNICATION SYSTEM AND SERVICE PROVISIONING METHOD THEREOF

BACKGROUND OF THE DISCLOSURE

1. Field of the Disclosure

The present disclosure generally relates to an integration of two communication networks, in particular, to an integrated communication system with a mobile network and a service provisioning method thereof are provided.

2. Description of Related Art

A conventional wired broadband access operator based on data over cable service interface specification (DOCSIS) technology may use DOCSIS operation support system (OSS) platform to manage cable broadband access service. In addition, after Ethernet passive optical network (EPON) technology is introduce in conjunction with DOCSIS, the DOCSIS OSS platform also may be utilized to manage the broadband access service based on the EPON technology. However, there are still many other communication networks which can provide broadband access service. It would be a challenge for the DOCSIS operator to integrate these communication networks.

SUMMARY OF THE DISCLOSURE

Accordingly, the present disclosure is directed to an integrated communication system and a service provisioning method thereof are provided, and the operation interface of the wired network can be utilized to manage Internet access service in a mobile network.

An embodiment of the disclosure provides an integrated communication system with a mobile network. The integrated communication system includes a network entity, a service provisioning system and an intermediary apparatus. The core network entity is resided in the mobile network. The service provisioning system is conformed to a wired network other than the mobile network. The intermediary apparatus is connected between the core network entity and the service provisioning system. The intermediary apparatus receives a configuration data with a first format conformed to the wired network from the service provisioning system, and transforms the configuration data into a configuration command with a second format conformed to the mobile network. The configuration data indicates the configuration command. The core network entity operates according to the configuration command.

An embodiment of the disclosure provides a service provisioning method. The method includes the following steps. A configuration data with a first format conformed to a wired network is received. The configuration data is transformed into a configuration command with a second format conformed to a mobile network other than the wired network. The configuration data indicates the configuration command. A core network entity in the mobile network operates according to the configuration command.

Based on the above description, in the integrated communication system and a service provisioning method thereof of the embodiment of the disclosure, the configuration data provided by the service provisioning system would be transformed into the second format, which can be parsed by the core network entity in the mobile network, so as to operate based on the configuration data in mobile network. Accordingly, an operator of the wired network can use the OSS platform of the service provisioning system to manage network entities and network devices in the mobile network without knowledge of OSS platform of the mobile network. In addition, it is easier for the operator of the wired network to integrate an existing mobile network system.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
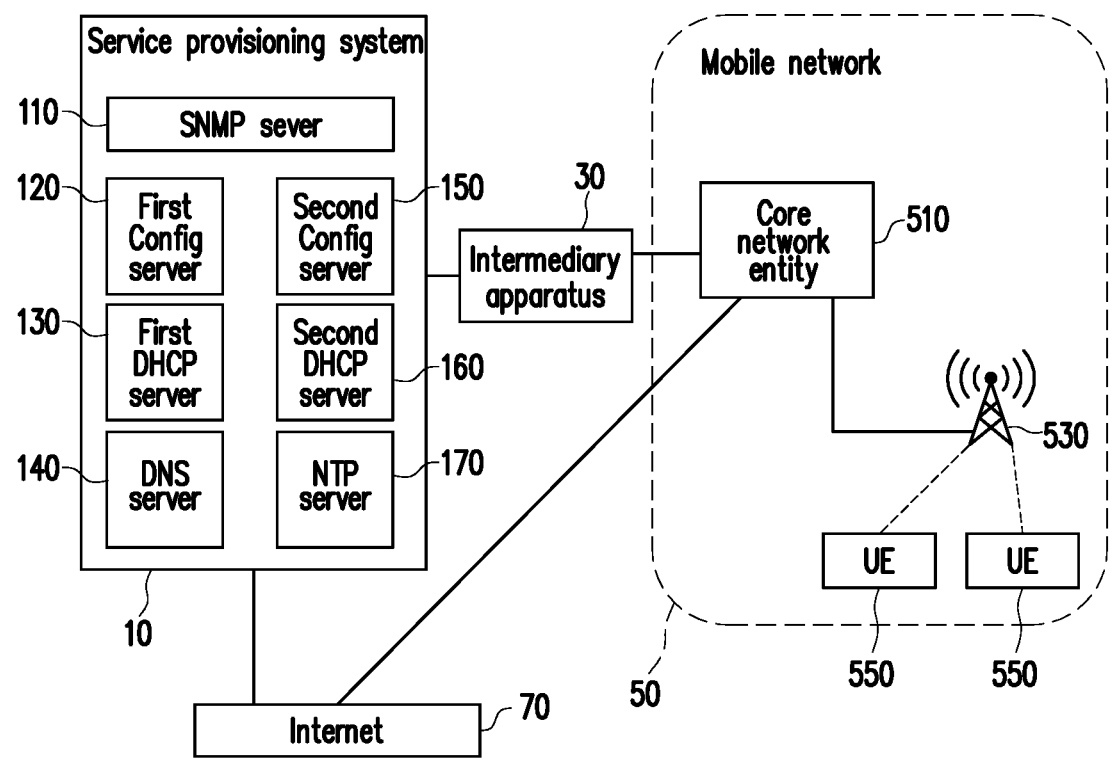
FIG. 1 is a schematic diagram of an integrated communication system according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a schematic diagram of an integrated communication system 1 according to an embodiment of the disclosure. Referring to FIG. 1, the integrated communication system 1 includes, but not limited to, a service provisioning system 10, an intermediary apparatus 30, one or more core network entity 510, one or more base station 530 and one or more user equipment (UE) 550.

In this embodiment, the service provisioning system 10 is an operation support system (OSS), a business support (BSS), or other operations, administration and maintenance (OAM) related platforms of a wired network. The wired network could be a cable network or a cable television network. The cable network based on cable service interface specification (DOCSIS) technology can provides Internet access service.

The service provisioning system 10 may include multiple servers. For example, a simple network management protocol (SNMP) server 110, a first configuration server 120, a first dynamic host configuration protocol (DHCP) server 130, a domain name system (DNS) server 140, a second configuration server 150, a second DHCP server 160, and a network time protocol (NTP) server 170. The servers 110-170 can handle its own supporting protocol. For example, the SNMP server 110 collects and organizes information about managed devices on IP networks through SNMP message, the first DHCP server 130 provides IP address through DHCP message, the DNS server 140 provides domain name resolution by DNS message, and the NTP server 170 provides clock synchronization through the NTP message. In this embodiment, the first configuration server 120, the first DHCP server 130, the DNS server 140 and NTP server 170 provide their application layer function for the core network entity 510, the base station 530, and/or UE 550. In addition, the second configuration server 150 and the second DHCP server 160 provide their application layer function for the intermediary apparatus 30. The operations of the servers 110-170 would be introduced later.

It should noticed that, in other embodiments, the service provisioning system 10 may include more IP application layer servers or at least one of the servers 110-170 illustrated in FIG. 1. The servers 110-170 may be implemented by one or more independent electronic devices or Integrated Circuits (ICs), and operations of the servers 110-170 may also be implemented by software.

The intermediary apparatus 30 could be realized by a desktop computer, a server, a work station, a router, or a processor. The intermediary apparatus 30 is connected between the service provisioning system 10 and the core network entity 510 in the mobile network 510. In some embodiments, operations of the intermediary apparatus 30 may also be implemented by software, which can be installed in one of the server 110-170 in the service provisioning system 10 or the core network entity 510 in the mobile network 50, and the intermediary apparatus 30 may be virtual cable modem (vCM). The intermediary apparatus 30 can handle OAM functions, such as customer relationship management (CRM), billing, online and offline charging, policy management, voucher management, etc., for DOCSIS or other specification/standard for broadband access service of wired network. In addition, the intermediary apparatus 30 also can handle OAM functions for the mobile network 50, such as 3G, 4G, 5G, or further generation. For example, the intermediary apparatus 30 can handle signaling and message of billing and operational support systems (BOSS) for 3G core network. The intermediary apparatus 30 may establish IP communications with the service provisioning system 10 and/or the core network entity 510 to transmit or receive data or message with each other.

The core network entity 510, the base station 530, and the UE 550 are in the mobile network 50. For different generations of the mobile network 50, the core network entity 510 and the base station 530 could be different. For example, regarding 3G and 4G networks, the core network entity 510 could include home subscribe server (HSS), mobility management entity (MME), serving gateway (S-GW), and packet data network gateway (PDN GW), and the base station 530 could be home evolved node B (HeNB), eNB, advanced base station (ABS), or base transceiver system (BTS). Regarding for 5G network, the core network entity 510 could include authentication server function (AUSF), access and mobility management function (AMF), session management function (SMF), and user plane function (UPF), and the base station 530 could be gNodeB (gNB). In addition, the UE 550 may have multiple implementations, for example, (but is not limited to) a mobile station, an advanced mobile station (AMS), a telephone device, a customer premise equipment (CPE), a wireless sensor, etc. As CPE, the UE 550 can facilitate broadband connection for devices it serves.

In order to facilitate understanding of an operation flow of the embodiment, multiple embodiments are provided below to describe an operation flow of the integrated communication system 1 of the embodiment in detail. In the following content, the method of the embodiment is described with reference of various devices in the integrated communication system 1. Various steps of the method of the embodiment may be adjusted according to an actual implementation, and are not limited by the disclosure.

Figure 2:
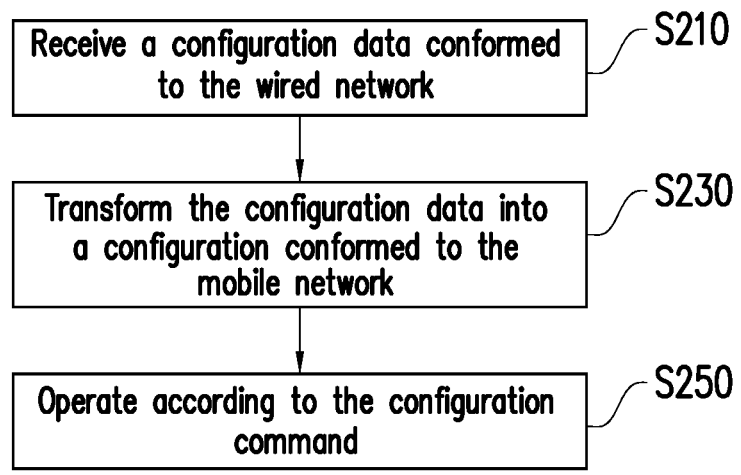
FIG. 2 is a flowchart illustrating a service provisioning method according to an embodiment of the disclosure.

FIG. 2 is a flowchart illustrating a service provisioning method according to an embodiment of the disclosure. Referring to FIG. 2, the intermediary apparatus 30 provides an interface conformed to operation system platform of the service provisioning system 10, and the intermediary apparatus 30 can receive a configuration data with a first format conformed to the wired network of the service provisioning system 10 (step S210). The configuration data may be related to equipment configurations of the core network entity 510 and/or the intermediary apparatus 30, and Internet service provision for the UE 550. The first format could be conformed to the protocol of DOCSIS, CableLabs specifications or other wired network related specifications, for example, OAM protocol data units (PDUs).

Then, the intermediary apparatus 30 may transform the configuration data into a configuration command with a second format conformed to the mobile network 50 (step S230). Specifically, in order to implement OSS/BSS platform of wired network into the mobile network 50, first the intermediary apparatus 30 should prepare a command with the second format, which can be parsed and identified by the core network entity 510. The second format could be conformed to the protocol of the mobile network 50, such as diameter, hypertext transfer protocol secure (HTTPS), etc. The configuration data generated by the service provisioning system 10 indicates the content in the configuration command for the core network entity 510. It means that, the difference between the configuration data and the configuration command is the format (such as type-length-value (TLV) format), but the same content is encapsulated with different style. In a transform procedure, for example, the intermediary apparatus 30 may extract the content of configuration data and abandon the header of the first format, then encapsulate the content with a header of the second format.

Then, the core network entity 510 is able to receive and parse the configuration command indicted by the service provisioning system 10, and the core network entity 510 may operate according to the configuration command (step S250). For example, the core network entity 510 may configure its equipment configuration, such as access point name (APN), IP, or quality of service (QoS) configuration, according to the content of the configuration command.

On the other hand, the core network entity 510 may transmit a message from the base station 530 or UE 550 according to the content of the configuration command. The intermediary apparatus 30 may transform the message with the second format from the core network entity 510 into a feedback data with the first format, and the service provisioning system 10 can receive and parse the feedback data. The message may be an address assignment request, a domain name resolution request, a clock synchronization request, a configuration request, or a response for the configuration data. In a transform procedure, for example, the intermediary apparatus 30 may extract the content of the message from the core network entity 510 and abandon the header of the second format, then encapsulate the content with a header of the first format. Therefore, the intermediary apparatus 30 may establish a bi-directional communication between the service provisioning system 10 and the core network entity 510.

In order to fully convey the spirit of the disclosure to those skilled in the art, several embodiments are provided below for further descriptions.

Figure 3:
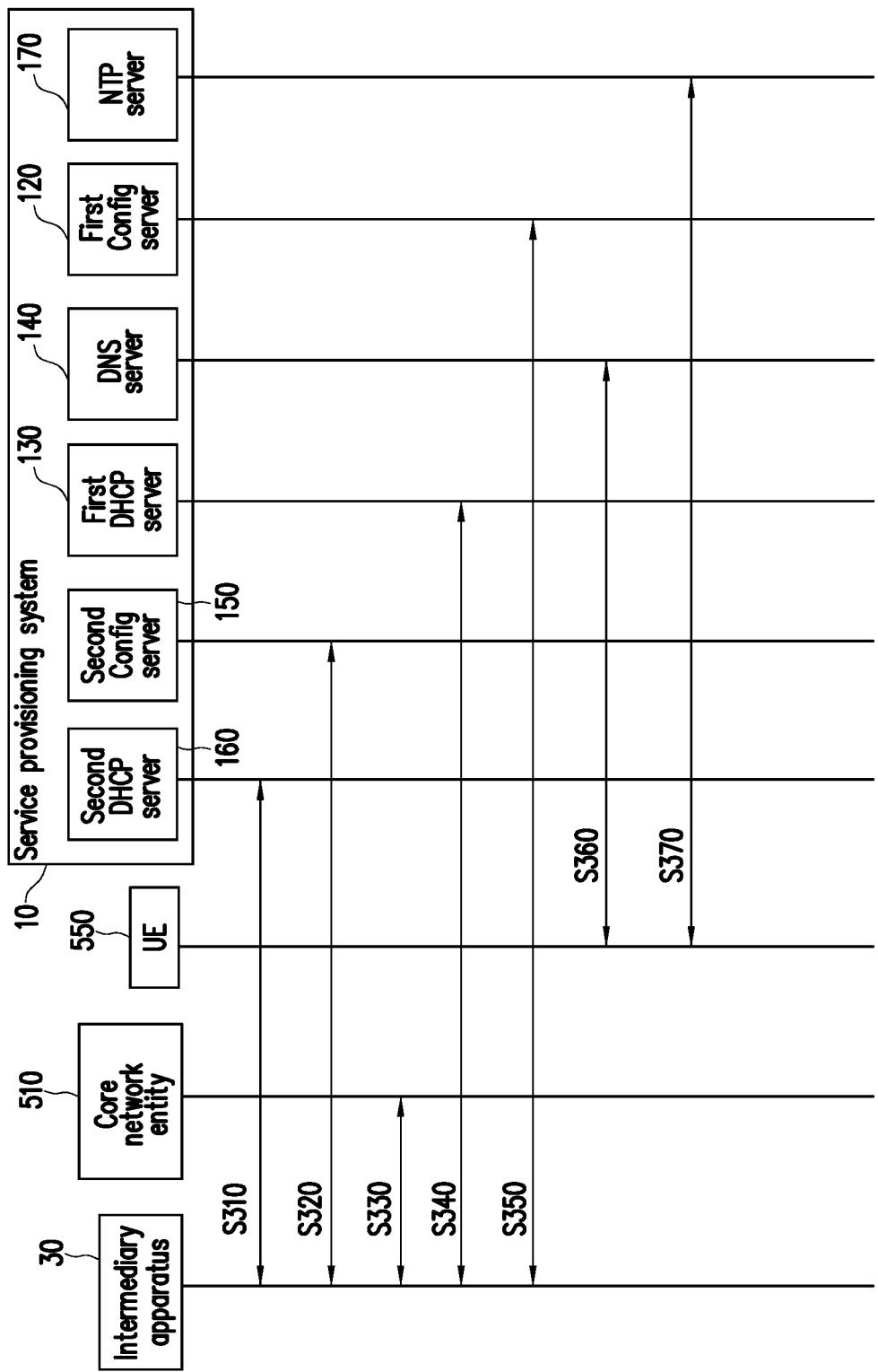
FIG. 3 is a signaling flowchart of a service provisioning mechanism according to an embodiment of the disclosure.

FIG. 3 is a signaling flowchart of a service provisioning mechanism according to an embodiment of the disclosure. Referring to FIG. 3, this embodiment is related to pre-configuration procedure for devices in mobile network 50. In step S310, after the intermediary apparatus 30 is booted or online, the intermediary apparatus 30 may broadcast a DHCP discovery message and recognize the existence of the second DHCP server 160 according to a response of the DHCP discovery message, such as DHCP offer message. Then, the intermediary apparatus 30 would obtain an IP address and basic configuration related to the second configuration server 150 (i.e., the equipment configuration of the intermediary apparatus 30) indicated by the second DHCP server 160 included in a DHCP option of DHCP message. The basic configuration may be network address and authentication parameter of the second configuration server 150.

In step S320, the intermediary apparatus 30 may ask and obtain further equipment configurations from the second configuration server 150 through trivial file transfer protocol (TFTP). It means that, the equipment configuration of the intermediary apparatus 30 would be transmitted through TFTP message. The further equipment configurations may be related to any function operated on the intermediary apparatus 30.

In step S340, the intermediary apparatus 30 may broadcast a DHCP discovery message and recognize the existence of the first DHCP server 130 according to a response of the DHCP discovery message, such as DHCP offer message. The intermediary apparatus 30 can obtain an IP address and basic configuration related to the first configuration server 120 (i.e., the equipment configuration of the intermediary apparatus 30) indicated by the first DHCP server 130 included in a DHCP option of DHCP message. On the other hand, the intermediary apparatus 30 can obtain an IP address for the core network entity 510 assigned by the first DHCP server 130, and the intermediary apparatus 30 encapsulates the IP address for the core network entity 510 with the second format to further transmit the IP address to the core network entity 510 (step S330), so that the core network entity 510 would obtain the assigned IP address. In some embodiments, if the UE 550 is camped on the mobile network 50, the intermediary apparatus 30 can obtain an IP address for the UE 550 assigned by the first DHCP server 130, and the UE 550 would obtain the assigned IP address via the intermediary apparatus 30 and the core network entity 510.

In step S350, the intermediary apparatus 30 may obtain further Internet service provisioning related configuration from the first configuration server 120 through TFTP. The further configurations may be QoS, subnets, or other network configuration of the UE 550. Similarly, these configurations would be transformed into the configuration command with the second format. It should be noticed that, the intermediary apparatus 30 may obtain IP configuration by the DHCP discovery message, but the IP configuration may not be used at a specific network interface of the intermediary apparatus 30.

In step S360, if a DNS query is received by the DNS server 140 from the UE 550, the UE 550 may obtain the data from the DNS server 140, and the data is about domain name resolution for the DNS query. In step S370, if a NTP synchronization request is received by the NTP server 170 from the UE 550, the UE 550 may obtain the data from the NTP server 170, and the data is about clock synchronization.

After the pre-configuration procedure, referring to FIG. 1, the UE 550 may access Internet 70 via interface provided by the service provisioning system 10 or the core network entity 510. It should be noticed that, the aforementioned configuration data may be carried by TFTP, SNMP or other messages.

In addition, in an equipment configuration update procedure, the first or second configuration server 120, 150 may generate a configuration data about updating new equipment configuration for the core network entity 510 or the UE 550, the intermediary apparatus 30 may also transform the updated configuration data into a configuration command with the second format and transmit the configuration command to the core network entity 510. Then, the intermediary apparatus 30 may transform a message responding to the configuration command into a feedback data with the first format and transmit the feedback data to the first or second configuration server 120, 150 in the service provisioning system 10.

Furthermore, in a status update procedure, the first or second configuration server 120, 150 may generates a configuration data about status query for the core network entity 510 or the UE 550, the intermediary apparatus 30 may also transform the configuration data into a configuration command with the second format and transmit the configuration command to the core network entity 510. Then, the intermediary apparatus 30 may transform a message about the status of the core network entity 510 or the UE 550 into a feedback data with the first format and transmit the feedback data to the first or second configuration server 120, 150 in the service provisioning system 10.

It should be noticed that, the service provisioning system 10 may provide more operation or maintenance functions for the mobile network 50, those skilled in the art may modify the content of the configuration data or message from the mobile network 50 based on actual requirement.

In summary, in the integrated communication system and a service provisioning method thereof of the embodiment of the disclosure, the intermediary apparatus provides interfaces to connect to the service provisioning system of the wired network and the mobile network, and the intermediary apparatus may transform the data or the message into another format identified by the receiver. Therefore, the operator of the wired network can use the original OSS/BSS platform to manage the mobile network, and the UE in the mobile network may further access Internet via the wired network.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An integrated communication system with a cellular mobile network, comprising:
   a core network entity, residing in a core network of the cellular mobile network and used for connecting to a base station in the cellular mobile network;
   a service provisioning system, conformed to a wired network other than the cellular mobile network; and
   an intermediary apparatus, connecting between the core network entity and the service provisioning system, receiving a configuration data with a first format conformed to the wired network from the service provisioning system, and transforming the configuration data into a configuration command with a second format conformed to the cellular mobile network,
   wherein the configuration data indicates the configuration command, the first format is related to a cable service specification, and the second format is related to a core network specification;
   wherein the core network entity operates according to the configuration command, wherein the configuration data is related to Internet service provision for at least one user equipment in the cellular mobile network,
wherein the service provisioning system comprises
a first dynamic host configuration protocol (DHCP) server,
wherein in response to an existence of the first DHCP server being recognized according to a DHCP discovery message, the intermediary apparatus obtaining the configuration data for the intermediary apparatus from the service provisioning system through trivial file transfer protocol (TFTP),
wherein the configuration data is about Internet Protocol (IP) address assignment, and
a second DHCP server,
wherein in response to an existence of the second DHCP server being recognized according to the DHCP discovery message, the intermediary apparatus obtaining another configuration data for the core network entity from the service provisioning system through TFTP.

2. The integrated communication system according to claim 1, wherein the intermediary apparatus transforms a message with the second format from the core network entity into a feedback data with the first format, and the service provisioning system receives the feedback data.

3. The integrated communication system according to claim 1, wherein the configuration data is related to an equipment configuration of the core network entity.

4. The integrated communication system according to claim 1, wherein the service provisioning system comprises: a domain name system (DNS) server, wherein in response to receiving a DNS query by the DNS server from the cellular mobile network, the intermediary apparatus obtaining the configuration data from the DNS server, wherein the configuration data is about domain name resolution.

5. The integrated communication system according to claim 1, wherein the service provisioning system comprises: a network time protocol (NTP) server, wherein in response to receiving a NTP synchronization request by the NTP server from the cellular mobile network, the intermediary apparatus obtaining the configuration data from the NTP server, wherein the configuration data is about clock synchronization.

6. The integrated communication system according to claim 1, wherein the configuration data is related to a status query for the core network entity.

7. The integrated communication system according to claim 1, wherein the configuration data is related to an equipment configuration of the intermediary apparatus, and the configuration data is comprised in a DHCP option.

8. The integrated communication system according to claim 1, wherein the wired network is a cable network, and a user equipment in the cellular mobile network accesses Internet via the cable network.

9. A service provisioning method, comprising:
receiving a configuration data with a first format conformed to a wired network;
transforming the configuration data into a configuration command with a second format conformed to a cellular mobile network other than the wired network,
wherein the configuration data indicates the configuration command, the first format is related to a cable service specification, and the second format is related to a core network specification; and operating, by a core network entity in a core network of the cellular mobile network, according to the configuration command,
wherein the core network entity is used for connecting to a base station in the cellular mobile network,
wherein the configuration data is related to Internet service provisioning for at least one user equipment in the cellular mobile network,
wherein after the step of transforming the configuration data into the configuration command with the second format conformed to the cellular mobile network, the method further comprises:
obtaining the configuration data for an intermediary apparatus, which transforms the configuration data, through trivial file transfer protocol (TFTP) from a first dynamic host configuration protocol (DHCP) server in response to a response of a DHCP discovery message from the first DHCP server,
wherein the configuration data is about Internet protocol (IP) address assignment; and
obtaining another configuration data for the core network entity through TFTP from a second DHCP server in response to a response of the DHCP discovery message from the second DHCP.

10. The service provisioning method according to claim 9, further comprising:
transforming a message with the second format from the core network entity into a feedback data with the first format.

11. The service provisioning method according to claim 9, wherein the configuration data is related to an equipment configuration of the core network entity.

12. The service provisioning method according to claim 9, wherein after the step of transforming the configuration data into the configuration command with the second format conformed to the cellular mobile network, the method comprises: obtaining the configuration data in response to receiving a domain name system (DNS) query from the cellular mobile network, wherein the configuration data is about domain name resolution.

13. The service provisioning method according to claim 9, wherein after the step of transforming the configuration data into the configuration command with the second format conformed to the cellular mobile network, the method comprises: obtaining the configuration data in response to receiving a network time protocol (NTP) synchronization request from the cellular mobile network, wherein the configuration data is about clock synchronization.

14. The service provisioning method according to claim 9, wherein the configuration data is related to a status query for the core network entity.

15. The service provisioning method according to claim 9, wherein the configuration data is related to an equipment configuration of the intermediary apparatus, and the configuration data is comprised in a DHCP option.

16. The service provisioning method according to claim 9, wherein the wired network is a cable network, and a user equipment in the cellular mobile network accesses Internet via the cable network.

* * * * *